United States Patent Office 3,202,453
Patented Aug. 24, 1965

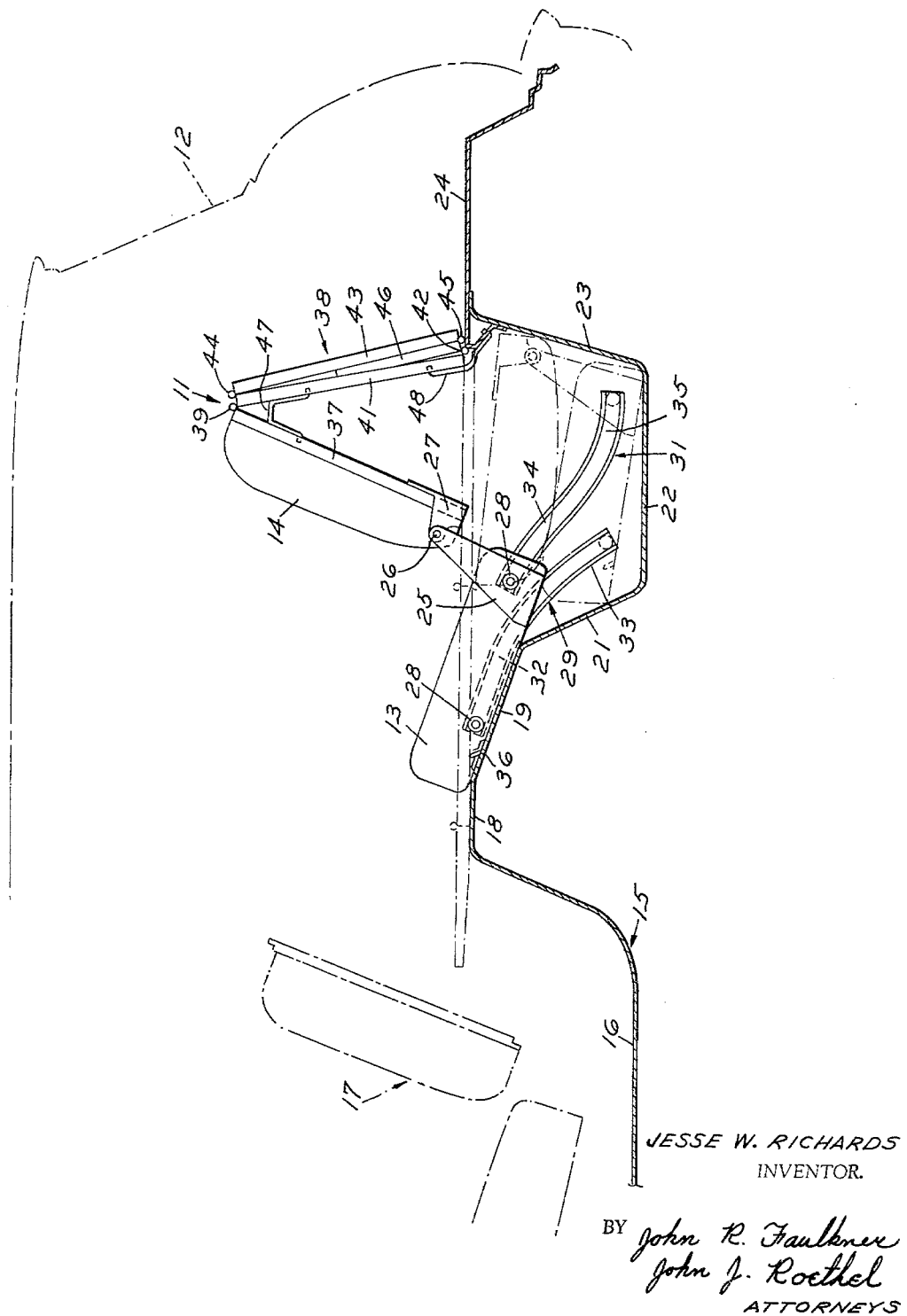

3,202,453
RETRACTABLE SEAT
Jesse W. Richards, Dearborn, Mich., assignor to Ford Motor Company, Dearborn, Mich., a corporation of Delaware
Filed July 9, 1963, Ser. No. 293,826
9 Claims. (Cl. 296—66)

This invention relates generally to vehicle seat structures and more particularly to a type of vehicle seat assembly which is foldable into a storage compartment in a vehicle floor so that the vehicle body may be adapted to carry cargo.

It is known practice to provide foldable rear seat assemblies for combined passenger and cargo carrying vehicles or "station wagons." These seats when in erected position for passenger carrying purposes may be forwardly or rearwardly facing. When the seats are folded into the storage compartment in the vehicle floor, the seat back and any floor extension panels hinged to the seat back are arranged to become a part of the cargo carrying floor of the vehicle and to conceal the folded seat therebeneath. Frequently, the folding of the seat to convert the vehicle from a passenger carrying capacity to a cargo carrying capacity requires the separate manipulation of several components of the seat assembly. First, the seat cushion must be moved to an inoperative position. This may be accomplished by simply swinging the cushion to a tilted position, or by swinging it to an inverted position, or by completely removing it from the vehicle body. Next, the seat back must then be swung into the storage compartment provided for it. And last, the extension panel or panels must be swung into a flush or coplanar relationship with the fixed cargo carrying portion of the vehicle floor.

It is an object of the present invention to reduce the number of components of the seat structure that must be manipulated to convert the vehicle from passenger carrying to cargo carrying capacity. The present invention requires that the vehicle body have a foldable seat storage compartment in its floor. The foldable seat comprises a seat portion and a back rest portion hingedly connected one to the other. The seat in normal operative or passenger carrying position has its seat portion disposed substantially at one side of the storage compartment and its back rest portion in upstanding relation to the seat portion. Coacting guide means are provided on the seat portion and the walls of the vehicle body, preferably in the form of roller and track elements, which control movement of the seat portion from the operative position to an inoperative position within the storage compartment. As the seat portion is moved from its operative to its inoperative position, the back rest portion is swung from its upstanding relationship to the seat portion into a stacked relationship with the latter in the storage compartment. The back rest portion has one section of foldable auxiliary or extension panels hinged to it, the hinge being at the uppermost edge of the back rest portion when the latter is in its upstanding position relative to the seat portion. In the upstanding position of the back rest portion at least one of the hinged extension panels forms a brace restraining the back rest portion from being tipped over backwards when the seat is occupied. After the back rest portion is in stacked and stored relationship to the seat portion, the auxiliary or extensible panels may be unfolded so as to lie in flush and coplanar relationship with the fixed portion of the cargo carrying area of the vehicle floor.

Other objects, advantages and features of the present invention will be made more apparent as the description proceeds, particularly when considered in connection with the accompanying drawing which shows an exemplary embodiment of the invention in side elevation.

The seat unit, generally designated 11, embodying the present invention is illustrated as a forwardly facing rear seat unit of an eight or nine passenger station wagon, a portion 12 of the body outline of a station wagon being shown in dot and dash outline. The seat unit 11 comprises a cushioned seat portion 13 and a cushioned back rest portion 14. This seat unit 11 is supported above the vehicle floor 15 which is shown in fragmentary sectional outline.

In the form illustrated, the vehicle floor 15 has a depressed well portion 16 which receives a second seat assembly 17 shown in dot and dash fragmentary outline. To the rear of the well 16 the floor 15 rises abruptly to provide clearance therebeneath for the rear axle and rear wheel suspension units of the vehicle (not shown). The summit 18 of this portion of the floor 15 is substantially horizontal and is followed by a ramp 19 which is downwardly inclined at a moderate angle to the horizontal portion 18. The moderately inclined ramp 19 is followed by a steeply declined portion 21 which terminates in a horizontal portion 22 of the floor having a substantially coplanar relationship with the bottom of the well 16. The floor portion 22 terminates in a substantially upright wall portion 23 which is secured to the underside of a substantially horizontal fixed cargo carrying portion or surface 24 of the vehicle floor. The portions 21, 22 and 23 of the floor 15 form a storage compartment or well that is adapted to receive the seat unit 11 when the latter is folded from the solid outline position to the dot and dash outline position.

The seat cushion 13 and the back rest cushion 14 are tied together by brackets 25 located at each side of the seat unit. The brackets 25 are rigidly secured to the sides of the seat cushion portion 13 and are pivotally connected at their upper ends by suitable pivot shafts 26 to brackets 27 secured to the back rest portion 14.

Journalled on each side of the seat portion 13 are a pair of spaced rollers 28, the rearmost roller being outboard of the bracket 25. Mounted on the body panels at each side of the storage compartment or well formed by the floor portions 21, 22 and 23 are a pair of curved tracks 29 and 31, respectively. The track 29 has a substantially horizontally extending portion 32 paralleling the ramp 19 of the floor 15 and a downwardly curved portion 33. The track 31 has a curved portion 34 which is curved downwardly and which then terminates in a reversely curved portion 35.

It should be noted here that the floor portion 19 is provided with at least one upstanding pin or safety catch 36 which projects through an aperture in the frame structure of the seat cushion portion 13 to hold the latter on the ramp 19 when the seat unit is erected for seating purposes. When it is desired to move the seat cushion portion 13 into the storage well, it is only necessary to slightly lift the front end of the seat cushion portion so that it comes off of the safety catch and then to push the cushion rearwardly. Sufficient clearance is allowed at the front end of the track 29 so that the roller on the seat cushion does not prevent the degree of upward movement necessary to lift the cushion off of the safety catch or catches 36.

The back rest portion 14 is provided with a substantially rigid frame 37 having an auxiliary double hinged panel or cargo carrying floor unit 38 hinged thereto.

The double hinged cargo carrying floor unit 38 comprises three sections, a main panel section 41, a secondary panel section 43 and a short panel section 46. The main section 41 is hinged through a piano hinge 39 to the back rest frame or panel 37 and is also hinged at 42 to the fixed cargo carrying portion 24 of the vehicle floor 15. The panel section 41 is an important structural member because it forms a part of the link system which provides for the automatic storage feature of the present seat unit. It also acts as a brace for the seat back in passenger carrying position and it forms a portion of the rear floor in cargo carrying position. As part of the linkage system for the automatic storage of the seat assembly, it is the controlling link, as will be more fully explained.

Hinged to the upper edge of the panel 41, the upper edge being the edge at the top when in upright position as shown in sold outline, is the secondary panel 43 which is of substantial equal length to the panel 41. The panel sections 41 and 43 are hinged together by a piano hinge indicated at 44. Hinged to the opposite edge of the panel 43 by a hinge 45 is the short panel section 46 which, when the seat unit is in passenger carrying condition, is folded between the panels 41 and 43.

A torsion bar indicated at 47 is positioned beneath the upper hinge of the seat back and the load carrying panel 41. A second torsion bar 48 is provided at the hinge connection between the load carrying panel 41 and the fixed portion 24 of the vehicle floor. The purpose of these torsion bars is to help overcome the combined weight of the system when the seat assembly is pulled out of the storage compartment or well and to resist the weight of the seat assembly and prevent slamming when the seat assembly is lowered into the well.

The seat assembly embodying the present invention is converted manually from passenger carrying position to cargo carrying position in the following manner: First, the forward edge of the seat cushion portion 13 is pulled slightly forward and up for release from the safety catch 36. A suitable hand strap (not shown) may be provided to assist in grasping the seat cushion for this forward and upward movement. After the forward edge of the seat portion is lifted above the safety catch, the seat must then be pushed rearwardly several inches. After this initial rearward movement, the weight of the seat cushion, the seat back and the extension panels will cause the seat cushion to slide into the well. That is, the seat cushion will move on the rollers 28 along the guide tracks 29 and 31 downwardly into the well. It will do this almost automatically with only minimal assistance being required from the person retracting the seat from its upright position to the storage position. As the seat cushion 13 moves rearwardly, it will pull the back rest 14 downwardly while at the same time swinging the same in a counterclockwise direction about the piano hinge 39. In the meanwhile the cargo carrying portion 41 will be swinging in a counterclockwise direction about the hinge 42, thereby acting as a control link guiding the upper edge of the back rest 14 as the latter swings forwardly into a horizontal position. As noted above, the torsion bars 47 and 48 ensure that the action will not be too abrupt or such as to cause the collapsing seat to be slammed into the storage compartment. When the seat cushion portion 13 reaches the bottom of the well, the back rest portion will be stacked about the seat cushion portion 13 in a substantially horizontal relationship as shown in dot and dash outline in the drawing. The portion 41 of the cargo carrying floor will be in a horizontal position in which it acts as an extension of the fixed portion 24 of the vehicle floor. The cargo carrying floor sections 43 and 46 will be stacked above the panel member 41, but then must only be flipped about their hinges into the extended position as shown in dot and dash outline in the drawing to complete the cargo carrying floor surface.

To restore the seat unit from its stored position to its upright cargo carrying position, the operator need only reverse the steps. That is, the panel section 46 first must be folded over the panel section 43 and the two are then folded over on the panel section 41. The operator then need only to reach down into the well through the opening between the floor section 19 and the forward edge of the panel section 41 and grasp the strap on the seat cushion 13. The seat cushion 13 must then be pulled up out of the well, this operation being assisted by the torsion bars 47 and 48, and the forward movement of the cushion must continue until its forward end is hooked over the safety catch 36. As this movement is occurring, the back rest portion 14 and the folded cargo carrying floor 38 respectively push and pull each other into their solid outline position shown in the drawing in which the back rest is ready to provide back support for a person sitting on the seat cushion 13 and the panel member 41 is ready to act as the necessary brace structure for the back rest.

Because the seat cushion sits on a rearward sloping ramp, the weight of a passenger sitting on the seat cushion 13 will maintain the seat in engagement with the catch 36. The seat cannot be made to travel rearwardly until the passenger's weight is removed.

It will be understood that the invention is not to be limited to the exact construction shown and described but that various changes and modifications may be made without departing from the spirit and scope of the invention as defined in the appended claims.

I claim:
1. In a vehicle body having a foldable seat storage compartment in the floor thereof,
   a seat assembly comprising a seat portion and a back rest portion hingedly connected one to the other,
   said seat assembly in normal operative position having its seat portion disposed substantially out of said storage compartment at one edge thereof and its back rest portion in upstanding relation to said seat portion,
   coacting guide means on said seat portion and the walls of said vehicle body controlling movement of said seat portion from said operative position to an inoperative position within said storage compartment,
   and a panel hingedly connected to and extending between said back rest portion and the opposite edge of said storage compartment for bracing said back rest portion in upstanding relation to said seat portion,
   said back rest portion being swingable beneath said hinged panel from upstanding relation to said seat portion into a substantially horizontal inoperative position within said storage compartment,
   said hinged panel, back rest portion and seat portion being superimposed one above the other when said back rest portion and seat portion are in inoperative position.

2. In a vehicle body having a foldable seat storage compartment in the floor thereof,
   a seat assembly comprising a seat portion and a back rest portion,
   and a first hinge means pivotally connecting the back rest portion to the seat portion,
   said seat assembly in normal operative position having its seat portion disposed above one transverse edge of said storage compartment and its back rest portion in upstanding relation to said seat portion,
   coacting guide means on said seat portion and the walls of said storage compartment extending longitudinally of said vehicle body controlling movement of said seat portion from said operative position to an inoperative position within said storage compartment,
   said seat portion when in said storage compartment in said inoperative position lying substantially parallel to its operative position, and a panel hingedly connected to and extending between said back rest portion and the opposite transverse edge of said storage compartment for bracing said back rest portion in upstanding relation to said seat portion, said back rest portion being swingable beneath said hinged panel and under control of the latter from upstanding relation to said seat portion into a substantially horizontal inoperative position within in said storage compartment, said hinged panel, back rest portion and seat portion being superimposed one above the other when said back rest portion and seat portion are in an inoperative position.

3. In a vehicle body having a floor with a foldable seat storage compartment therein, said floor having a ramp at one edge of said storage compartment, a seat assembly comprising a seat portion and a back rest portion, said seat assembly in normal operative position having its seat portion disposed on said ramp and its back rest portion in upstanding position relative to said seat portion, pivot means pivotally connecting the part of said back rest portion comprising the lower part thereof when in upstanding position to said seat portion, guide means on the side walls of said storage compartment engageable by coacting means on said seat portion and controlling movement of the latter from said ramp to an inoperative position within said storage compartment, and a panel member hingedly connected at one edge thereof to said back rest portion and at the opposite edge thereof to said floor contiguous to the opposite edge of said storage compartment, said back rest portion being swingable under control of said panel member about said pivot means from said upstanding position into a stacked position above said seat portion in said storage compartment.

4. In a vehicle body having a floor with a foldable seat storage compartment therein according to claim 3 in which a first torsion means is interposed between said seat back rest portion and said panel member, and a second torsion means is interposed between said panel member and said floor, said torsion means counterbalancing the weight of the components of said seat assembly as the latter is moved into and out of said storage compartment.

5. In a vehicle body having a foldable seat storage compartment in the floor thereof, a seat assembly comprising a seat portion and a back rest portion hingedly connected one to the other, said seat assembly in normal occupant receiving position having its seat portion disposed substantially out of said storage compartment at one side thereof and its back rest portion in upstanding relation to said seat portion, a floor board panel hinged to and extending from the distal portion of said back rest portion to the other side of said storage compartment to which it is also hinged, coacting guide means on said seat portion and said vehicle body controlling movement of said seat portion from said occupant receiving position to an inoperative position within said storage compartment, said seat portion upon being moved into said storage compartment on said guide means and causing said back rest portion to swing beneath said floor board panel into stacked relationship over said seat portion whereby said floor board panel substantially conceals said storage compartment therebeneath.

6. In a vehicle body having a floor with a foldable seat storage compartment therein, a seat assembly comprising a seat portion and a back rest portion, a floor panel pivotally connected as one edge to the vehicle floor adjacent one edge of said compartment, said floor panel being pivotally connected at its opposite edge to the one edge of said back rest portion, hinge means hingedly connecting the distal portion of said back rest portion to said seat portion adjacent the edge of the latter nearest said one edge of said compartment, said seat assembly in occupant receiving position having its seat portion disposed out of said storage compartment and its back rest portion and said floor panel in upstanding position, said back rest portion and said floor panel being inclined relative to one another in intersecting planes at the pivotal connection therebetween, and guide means on the side walls of said storage compartment engageable by coacting means on said seat portion controlling movement of the latter from occupant receiving position of said seat to an inoperative position within said storage compartment, said back rest and floor panel being swingable into stacked position above said seat portion upon movement of the latter to its inoperative position.

7. In a vehicle body having a floor with a foldable seat storage compartment therein according to claim 6 in which auxiliary floor panels are pivotally connected at one edge thereof to said one edge of the floor panel hinged to said back rest portion, said auxiliary floor panels being extensible from said one edge of the floor panel hinged to said back rest portion in a direction to overlie the portion of the vehicle body floor covered in part by said seat portion in occupant receiving position of the seat assembly after said seat portion has been moved into said storage compartment.

8. In a vehicle body having a floor with a foldable seat storage compartment therein, said floor having a ramp at one edge of said storage compartment, a seat assembly comprising a seat portion and a back rest portion, a floor panel pivotally connected at one edge to the vehicle floor adjacent one edge of said compartment, said floor panel being pivotally connected at its opposite edge to one edge of said back rest portion, hinge means hingedly connecting the distal portion of said back rest portion to said seat portion adjacent the edge of the latter nearest said one edge of said compartment, said seat assembly in occupant receiving position having its seat portion disposed on said ramp and its back rest portion and said floor panel in upstanding position, said back rest portion and said floor panel being inclined relative to one another in intersecting planes at the pivotal connection therebetween, and guide means on the side walls of said storage compartment engageable by coacting means at said seat portion controlling movement of the latter from said ramp to the inoperative position within said storage compartment, said back rest and floor panel being swingable into stacked position above said seat portion upon movement of the latter to its inoperative position.

9. In a vehicle body having a floor with a foldable seat storage compartment therein according to claim 8 in which auxiliary floor panels are pivotally connected at one edge thereof to said one edge of the floor panel hinged to said back rest portion, said auxiliary floor panels being extensible from said one edge of the floor panel hinged to said back rest portion in a direction to overlie the portion of the vehicle body floor including said ramp after said seat portion has been moved into said storage compartment.

References Cited by the Examiner
UNITED STATES PATENTS
538,842   5/95   McLean ---------------- 296—66
2,075,449   3/37   McMahon ------------ 296—65 X
2,105,740   1/38   Knudson -------------- 296—69
3,151,906   10/64   Roberts ------------- 296—69 X PHILIP ARNOLD, *Primary Examiner.*
A. HARRY LEVY, *Examiner.*